United States Patent [19]

Hofmann

[11] Patent Number: 5,105,980
[45] Date of Patent: Apr. 21, 1992

[54] AUTOMATIC DECK WASHER TRANSFER APPARATUS

[75] Inventor: Klaus Hofmann, Reading, Pa.

[73] Assignee: Construction Fastners, Inc., Wyomissing, Pa.

[21] Appl. No.: 594,863

[22] Filed: Oct. 9, 1990

Related U.S. Application Data

[63] Continuation of Ser. No. 300,279, Jan. 19, 1989, abandoned.

[51] Int. Cl.⁵ .............................................. B23Q 7/00
[52] U.S. Cl. .................................... 221/185; 221/236; 221/239; 221/261; 221/270
[58] Field of Search ............... 221/1, 105, 224, 236, 221/238, 239, 251, 258, 261, 267, 268, 270, 191, 194; 29/809; 414/797.4, 797.9; 227/18, 107, 114, 116, 138

[56] References Cited

U.S. PATENT DOCUMENTS

| 2,214,814 | 9/1940 | Hambleton | 221/267 X |
| 2,385,521 | 9/1945 | Mead | 221/238 X |
| 3,765,524 | 10/1973 | Fallon | 221/239 X |

Primary Examiner—David H. Bollinger
Attorney, Agent, or Firm—Leonard M. Quittner

[57] ABSTRACT

An apparatus for transferring a deck washer from a storage magazine containing a stack of deck washers to a deck for installation. The transfer is accomplished by a reciprocating trolley which retrieves a washer from the stack and whose reciprocation urges the washer down a ramp on the trolley in to a holding chamber for installation.

2 Claims, 2 Drawing Sheets

AUTOMATIC DECK WASHER TRANSFER APPARATUS

CROSS REFERENCE

This is a continuation of co-pending application Ser. No. 07/300,279 filed on Jan. 19, 1989 now abandoned.

FEDERALLY-SPONSORED RIGHTS

The invention herein was made without any Federal sponsorship or contribution.

BACKGROUND OF THE INVENTION

1. The Field of the Invention

The field of the invention relates to an improved deck washer transfer apparatus and method for automatically installing a deck washer onto a deck.

2. Description of the Prior Art

Deck washer transfer means and methods are incorporated in a class of devices known as automatic deck fasteners. These are useful in the installation of deck insulation and/or membrane for example on a roof. A portable driving device feeds a deck screw through a deck washer to fasten it to a deck for the purpose of holding the insulation and/or membrane down. Typical of the art is the device of U.S. Pat. No. 4,657,167 (hereafter '167) to Mays, April, 1987. See also British Patent GB2,181,081 A (hereafter GB'081); U.S. Pat. No. 4,246,939 (hereafter '939) to Boegel, January, 1981 and pending application Ser. No. 161,980 (Feb. 29, 1988; by Zahn). Each discloses, in conjunction with the driving apparatus means for transferring an apertured deck washer from a storage magazine to a position which aligns the aperture with a deck fastener screw's longitudinal axis for installation.

'939 discloses a sliding fixture which contains a defined slot in the pattern of a washer perimeter (FIG. 17 and 18) in combination with free fall. '167 discloses a pivot in a horizontal axis transfer by defined sloted fixture combination with free fall, see also GB'081, as does the Zahn application.

In operation each of the foregoing deck transfer means fails or jams from time to time by virtue of irregularities in washer shape, uncoordinated pivot or sliding motion, free fall misposition and nonalignment of the washer aperture with the deck screw longitudinal axis. Each requires a special defined fixture in the transfer mechanism depending on washer configuration which in the market place, is variable to a great degree. For example, deck washers are known which are round, hexagonal, square, oblong, oblong rounded and oval.

SUMMARY OF THE INVENTION

The present invention provides a completely reliable transfer apparatus and method which maybe tied to and coordinated with the travel of the driver or can be operated manually. A multiplicity of deck washer shapes can be accommodated without any significant change in fixture design and accurate registration instead of alignment is assured.

A storage magazine holds a stack of deck washers under restraint, save a bottom most washer. This washer is retrieved from the magazine by a trolley which reciprocates adjacent to and under the magazine on the downward and upward motion of the driver or may be manipulated manually with a lever, for example, a foot pedal which provides the same motion. The trolley travels in a pair of ways which are ramped downward from the magazine to a holding chamber in line with the driver's axis.

A lifting shoulder on the trolley lifts the stack and frees the bottom most washer to seat itself on the trolley as the trolley advances under the stack. The bottom most washer is extracted from the magazine transversely by the trolley's retreating motion and is urged onto the ramp for transfer to the holding chamber. Continued advance of the trolley assures positive placement of the washer in the chamber and perfect registration of its aperture with the driver's drive path. As will be shown, the trolley is of an open design and not constrained to accept a particular shape.

An object of the invention is to eliminate failure or jamming by assuring positive centering registration of the washer in its final position.

A further object of the invention is to provide a transfer mechanism which will accept washers regardless of shape.

Other objects, advantages and features of the present invention will be apparent to those skilled in the art from the following description taken in conjunction with the accompanying drawings.

DESCRIPTION OF DRAWINGS

The present invention may be better understood by reference to the drawings wherein 4 figures are shown on 2 sheets. The numbers shown on the drawings for the various parts of the invention are consistent throughout so that a number indicating a part in one drawing will indicated the same part in another drawing.

DESCRIPTION OF THE PREFERRED EMBODIMENT

Figure 1:
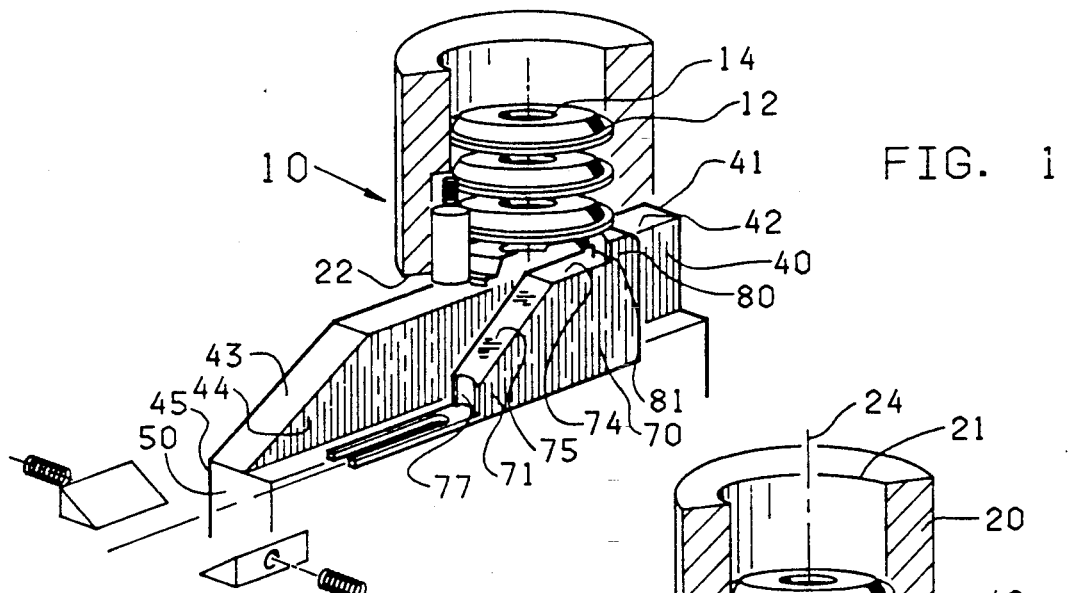
FIGS. 1, 2 and 3 show the trolley of the invention in cutaway perspective view and how it cooperates with other parts of the invention and show stepwise the transfer of a deck washer from the magazine to the holding chamber.
Figure 2:
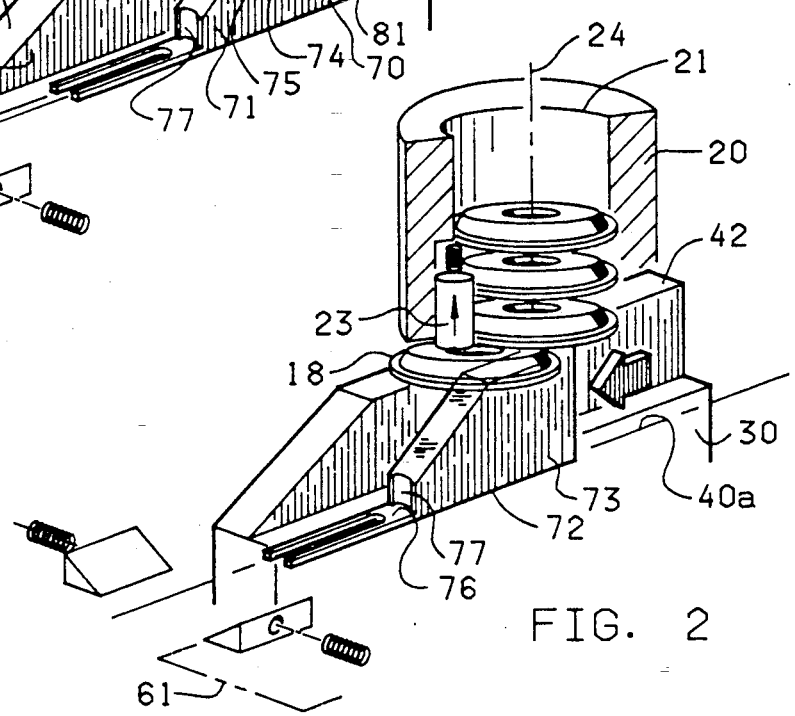
Figure 3:
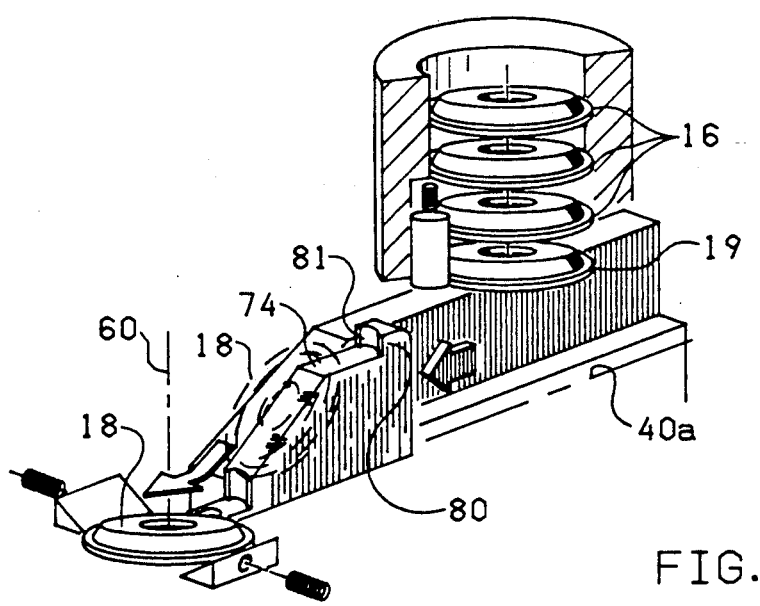

The preferred embodiment best is best described as deckwasher transfer apparatus 10 for transferring a deck washer 12 which has an aperture 14 centrally disposed thereon, and is comprised of a generally tubular deck washer storage magazine 20 mounted upright on a mobile base 30. The base is equipped exteriorly with at least 2 wheels, not shown, for travel along a deck in essentially a straight line of travel and is comprised of a base structure of a generally "U" shape gross section with a bottom and upright sides 40 only one of which are shown in FIGS. 1, 2, and 3 for clarity.

The magazine has an upper entry end 21 for receiving stack of deck washers 16 and a lower discharge end 22 from which a bottom most deck washer 18 free of the stack is released for transfer. The magazine houses adjacent to and upward of the discharge end's perimeter at least one spring loaded restraining pin means 23 which moves parallel to the magazine's central vertical axis 24. The restraining pin restrains and holds in a plane perpendicular to the central axis, the stack and by its upward motion the pin clears and releases from the stack the bottom most washer.

Centrally disposed in the bottom of the base longitudinally and parallel to the travel line is a pair of identical parallel ways 40a of which only one is shown for clarity, having a first terminus 41 adjacent a first upper surface 42 in a plane parallel to the ways immediately under the discharge end of the magazine, a first ramp portion 43 which is directed in a downward incline at a defined angle 44 to a second terminus 45 adjacent to a deck washer holding chamber 50 situated in the base centrally under the vertical axis defining a driving pathway 60 of an optionally disposed deck fastener driving means 61 to receive the bottom most deck washer after it has been transferred along the ramp by a transfer trolley means 70 guidingly moving between the ways reciprocatingly in sliding contact therewith. The trolley is a truncated rectangular block whose height is substantially greater than a defined height and is truncated angularly along said width to form a second ramp at an angle 71 which is equal to or greater than the ramp angle, the block having a bottom surface 72 and side surfaces 73 in sliding contact with the ways, a first upper surface 74 in a plane parallel to the ways.

Adjacent to the lowest end portion of the second ramp is a horizontally extending fork 76 adjacent to containing a registration notch 77 for registering the deck washer centrally in the chamber. Protruding from the horizontal surface toward the chamber is a slotted registration fork 78 for holding the deck washer horizontal while it is registered at the end of the transfer.

Disposed on the first upper surface of the trolley at a defined height is a block shaped lifting shoulder 80 higher than the trolley's upper surface on whose side toward the incline is disposed a washer receiving groove 81.

Attention is directed to FIG. 1. After the trolley has advanced under the discharge end the bottom most washer, the stack and the restraining pin are lifted by the lifting shoulder as the trolley completes its advance to the first terminus whereupon the bottom most washer is disengaged from the restraining pin, drops onto the first upper surface and is engaged by the groove. See FIG. 2. When the trolley retreats the bottom most deck washer is extracted from under the magazine transversely and urged down the ramp onto the fork and into the holding chamber for registration. See FIG. 3.

The holding chamber is open at its top and has for its bottom a pair of oppositely disposed gate means 62 to hold in a horizontal plane the floor most deck washer perpendicular to and intersecting centrally with the drive path 60 when the washer transferred into the chamber.

Figure 4A:
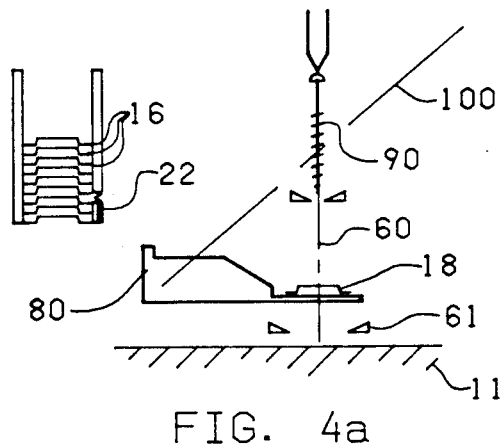
FIG. 4a-e shows in skeletal form how the motion of the apparatus may coordinate with a fastener and a fastener driving means in a fully automatic configuration.

Reference is made to FIG. 4a–e. After mobile alignment of the base to a new installation position the bottom most washer 18 is resting in the holding chamber, as shown in FIG. 4a above the gates 61 on the registration fork 78 centered on the drive path 60 awaiting a deck fastener 90. The stack 16 is restrained by the restraining pin 22.

Figure 4B:
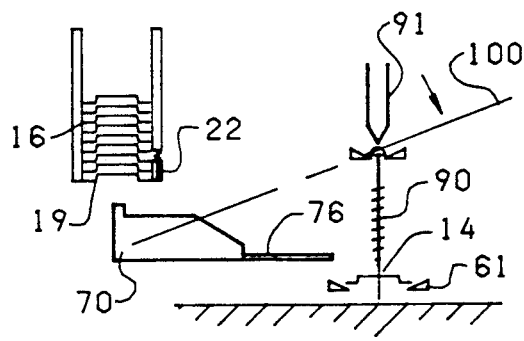
Figure 4C:
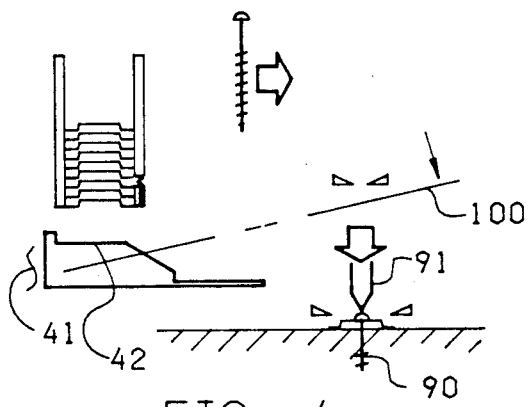
Figure 4D:
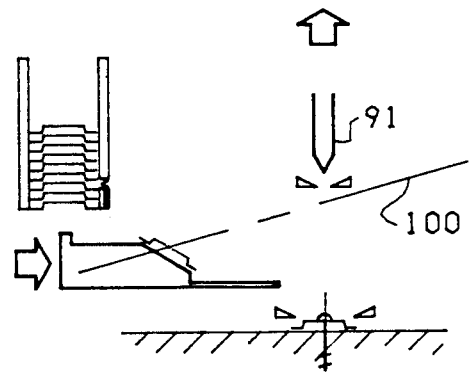
Figure 4E:
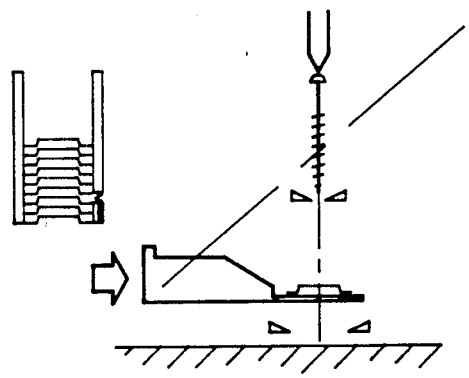

See FIG. 4b. The driver 91 is lowered guidingly against the fastener which enters the aperture. The motion downward can be taken from any motion transfer means 100 such as a driver connected lever or a foot pedal to cause the trolley 70 to advance toward the magazine, lifting a next bottom most washer 19 and the stack 16 and retaining pin 22 upward. See FIG. 4c. As the fastener is driven into the deck 11 the trolley reaches the first terminus 41 causing the next bottom most washer 19 to come to rest engagingly in the receiving groove and on the first second upper portion 42 of the trolley. See FIG. 4d and e. As the driver is retracted the trolley retreats toward the second terminus 45 extracting the bottom washer transversely away from the magazine the washer is urged down the ramp by the trolley incline which will emerge from the ramp and into the registration notch adjacent to the fork for central registration in the pathway. The mobile base is then shifted to the next installation position to receive another deck fastener. See FIG. 4a.

It is understood that the trolley motion may be accomplished by any means either transferred from the motion of a reciprocating driver means or independently, for example, by a foot pedal.

Since many modifications, variations and changes in detail may be made to the presently described embodiment, it is intended that all matter in the foregoing description and accompanying drawings be interpreted as illustrative and not by way of limitation.

What is claimed is:

1. An apparatus for automatically transferring a deck washer with a centrally disposed aperture to receive a deck fastener to be driven therethrough comprising:
    (a) a mobile base which has two or more wheels for traveling along a deck essentially in a straight line of travel, the base having
        (i) means for supporting the wheels rotationally exterior to the base,
        (ii) a longitudinally elongated base support structure whose longitudinal axis is parallel to the line of travel, the structure being of a defined length and having a "U" shaped cross-section, the arms of the "U" forming upright sides of the structure and the bottom of the "U" defining a floor in which are disposed longitudinally a pair of parallel ways, the sides of the base structure being truncated to form a first ramp with an upper and a lower end angled downward at a defined angle in the direction of the line of travel, there being situated at the first ramp's upper end, a first upper surface situated superiorly of the sides and parallel to the ways and adjacent to the first ramp's upper end, and
        (iii) an open topped holding chamber forward of the first ramp's lower end for receiving a deck washer, the chamber having a floor consisting of a pair of gates to restrain a deck washer therein and to allow said washer to pass through the gates when urged by a driven fastener;
    (b) a magazine which is essentially tubular and is disposed in an upright position superior to the base structure's first upper surface and having means to restrain a stack of deck washers in a plane parallel said upper surface and release from the stack a bottom most washer;
    (c) a transfer trolley which is disposed slidingly between the parallel ways and extending superiorly therefrom, the trolley having:
        (i) a truncated block whose truncation forms a second ramp with an upper end and a lower end, the ramp being directed downward in the direction of the line of travel at an angle greater than the first ramp angle and whose length is less than the defined length of the base structure;
        (ii) a second upper surface adjacent to the second ramp's upper end which is coplanar with the first upper surface of the base structure, the second upper surface having at its end distal to the second ramp an upright shoulder to interact with the magazine restraining means such that the bottom most washer when released will fall on to the second upper surface, and (iii) a fork extending longitudinally from the second ramp's lower end to receive a deck washer sliding down the second ramp and transfer it to the holding chamber;

(d) means to cause the trolley to reciprocate slidingly between the ways.

2. An apparatus for transferring a deck washer as in claim 1 wherein the reciprocating motion of the trolley is caused by a fastener driver connected to the trolley by linkage means, when said driver is being driven downward along a path whose axis is perpendicular to the line of travel and passes through the aperture of a deck washer disposed in the receiving chamber.

* * * * *